United States Patent
McCool et al.

(10) Patent No.: US 10,482,114 B2
(45) Date of Patent: Nov. 19, 2019

(54) SYSTEM AND METHOD FOR MAINTENANCE OF QUESTIONS AND ANSWERS THROUGH COLLABORATIVE AND COMMUNITY EDITING

(75) Inventors: Rob McCool, Menlo Park, CA (US);
Luke Wroblewski, San Jose, CA (US);
Eckart Walther, Palo Alto, CA (US);
Michael W. Albers, Menlo Park, CA (US)

(73) Assignee: Oath Inc., New York, NY (US)

( * ) Notice: Subject to any disclaimer, the term of this patent is extended or adjusted under 35 U.S.C. 154(b) by 1209 days.

(21) Appl. No.: 12/056,818

(22) Filed: Mar. 27, 2008

(65) Prior Publication Data

US 2009/0248659 A1 Oct. 1, 2009

(51) Int. Cl.
*G06F 7/00* (2006.01)
*G06F 16/332* (2019.01)

(52) U.S. Cl.
CPC .................. *G06F 16/3329* (2019.01)

(58) Field of Classification Search
CPC .................................................. G06F 16/3329
USPC .... 707/999.002, 999.102, 999.003, 999.004, 707/791, 600
See application file for complete search history.

(56) References Cited

U.S. PATENT DOCUMENTS

| | | | | |
|---|---|---|---|---|
| 6,028,601 A * | 2/2000 | Machiraju | ............ | G06F 16/3344 715/705 |
| 6,226,656 B1 * | 5/2001 | Zawadzki et al. | ............ | 715/235 |
| 6,856,986 B1 * | 2/2005 | Rossides | ................ | G06Q 30/02 |
| 7,269,579 B2 * | 9/2007 | Lovegren | ............... | G06Q 10/10 706/47 |
| 7,280,991 B1 * | 10/2007 | Beams | ..................... | G09B 5/14 706/46 |
| 7,472,071 B2 * | 12/2008 | Marks | .............. | G06Q 10/06311 705/7.13 |
| 7,475,815 B2 * | 1/2009 | Sattler | ................. | G06F 16/9535 235/386 |
| 7,548,914 B2 * | 6/2009 | Bell | ...................... | G06F 17/218 |
| 7,587,389 B2 * | 9/2009 | Sugihara | ............. | G06F 16/3329 |
| 7,805,303 B2 * | 9/2010 | Sugihara | ............. | G06F 17/2785 704/257 |
| 8,285,697 B1 * | 10/2012 | Truher | ................ | H04L 67/1085 707/706 |
| 2002/0169595 A1 * | 11/2002 | Agichtein | ........... | G06F 17/2705 704/9 |
| 2005/0273336 A1 * | 12/2005 | Chang | ..................... | G06F 8/315 704/257 |
| 2006/0206472 A1 * | 9/2006 | Masuichi | ............ | G06F 17/2785 |

(Continued)

*Primary Examiner* — Eliyah S. Harper
(74) *Attorney, Agent, or Firm* — Pillsbury Winthrop Shaw Pittman LLP (57) ABSTRACT

Systems, methods, and computer program products are disclosed for asking and searching for the answer to given questions, retrieving answers to such questions, as well as presenting such answers in a user-generated content style framework on a search engine. The system of the present invention comprises a question processor, operative to determine whether a question entered by a user has been previously answered, an answer data store storing answers to previously asked questions stored therein, an answer repository storing questions not yet answered by another user, and an editor tool operative to format an answer stored in the answer data store into user-generated content style and migrate the answer to a user-generated content style web page.

18 Claims, 4 Drawing Sheets

(56) References Cited

U.S. PATENT DOCUMENTS

| | | | |
|---|---|---|---|
| 2007/0055656 A1* | 3/2007 | Tunstall-Pedoe | G06F 17/28 |
| 2007/0219958 A1* | 9/2007 | Park et al. | 707/3 |
| 2007/0219978 A1* | 9/2007 | Myers | 707/5 |
| 2007/0271237 A1* | 11/2007 | Chang | 707/3 |
| 2008/0040114 A1* | 2/2008 | Zhou | G06F 17/2785 |
| | | | 704/257 |
| 2008/0294637 A1* | 11/2008 | Liu | G06Q 30/02 |
| 2008/0306908 A1* | 12/2008 | Agrawal | G06F 16/951 |
| 2009/0077047 A1* | 3/2009 | Cooper | G06F 17/2785 |
| 2009/0089044 A1* | 4/2009 | Cooper | G06F 17/275 |
| | | | 704/9 |
| 2013/0041921 A1* | 2/2013 | Cooper | G06F 17/2735 |
| | | | 707/780 |

* cited by examiner

SYSTEM AND METHOD FOR MAINTENANCE OF QUESTIONS AND ANSWERS THROUGH COLLABORATIVE AND COMMUNITY EDITING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention generally provides systems, methods, and computer program products for allowing users to ask and search for answers to specific questions of interest. More specifically, the present invention provides systems, methods, and computer program products that facilitate the entry of questions, search and retrieval of answers to questions, as well as display of answers to such questions in a user-generated content style framework.

BACKGROUND OF THE INVENTION

A number of techniques are known for searching and retrieving answers to questions of interest. Providers of traditional internet search technologies maintain web sites that offer keyword-based searching, where a user enters one or more terms relevant to a particular question in Boolean format and the search engine provides links to content items that are pertinent to the particular keywords that the user supplies. This technology is limited in that, often times, links that the search engine retrieves only marginally relate to the original question that the user is posing. Additionally, the user must sort through a large and often overwhelming result set, web pages or content items to identify potentially useful information to answer their questions.

Certain content providers maintain web sites that function as online encyclopedias or information repositories, for example, Wikipedia.org. Systems such as wikipedia are enhanced by the collaborative efforts of its user-base, which provide content for a plethora of topics of interest. As of September 2007, wikipedia had approximately 8.29 million articles in 253 languages, comprising a combined total of over 1.41 billion words. Wikipedia articles are written collaboratively by volunteers around the world, with the vast majority of articles editable by any user with access to the system. Due to the open nature of Wikipedia, however, critics question its reliability and accuracy. Furthermore, some criticize the system for its susceptibility to vandalism and false or unverifiable information, bias and inconsistencies, as well as for favoring consensus over credentials in its editorial process. Finally, a user must sort through individual articles to find a topic most relevant to his or her specific question, as well as extract an answer on their own with the ultimate goal of simply wanting to answer their question.

Still other content providers maintain web sites that return links to questions and corresponding answers in response to a natural language query by a user. For example: Yahoo! Answers is a website that provides a community-driven knowledge market that allows a user to ask questions of other users as well as answer questions that other users are posing. A given user may either post a new question or input the question as a search string, which is compared to a database of previously asked-and-answered questions. The site provides members with the chance to earn points as a way to encourage participation; Yahoo! Answers contains contained 65 million answers to more than 7 million questions as of November 2006. This site, however, is limited in that many questions contain more than one correct answer and there is insufficient context to interpret the more helpful or meaningful answers from the total number of answers available for any given question. Additionally, questions that are similar in scope and content to other questions already answered, but comprising a disparate word form, may be difficult for a user to locate or review in answering their questions.

Currently available systems have drawbacks in that they only address a piece of an overall solution for providing an efficient and useful question and answer platform. While traditional search providers and online encyclopedias offer links to well-indexed portions of the available informational content on the World Wide Web, they are lacking in the ability to provide narrowly tailored answers to specific questions. For example, while Yahoo! Answers provides narrowly tailored answers to specific questions, it suffers from a lack of quantity and quality in the total available content and does not provide context to help a user interpret an answer to a specific question.

In order to overcome shortcomings and other problems associated with existing apparatuses and techniques for searching and retrieving answers to questions, embodiments of the present invention provide systems, methods, and computer readable media for asking questions, searching and retrieving answers to such questions, and presenting a user-generated content style framework to display quality answers to such questions.

SUMMARY OF THE INVENTION

The present invention is directed towards systems, methods, and computer readable media comprising program code for asking questions, searching and retrieving answers to such questions, and presenting answers to such questions in a user-generated content style framework on a search engine.

The system for asking and searching for answers to a given question on a search engine comprises a question processor that is operative to determine whether a question entered by a user has been previously answered, an answer data store storing answers to previously asked questions stored therein, and an answer repository storing questions not yet answered by another user. The system further comprises an editor tool operative to format an answer stored in the answer data store into user-generated content style and migrate the answer to a user-generated content style web page.

The method of the present invention comprises categorizing a question under one or more topics, opening the question to be answered by another user, and receiving one or more answers to the question within a given time period. The method further comprises selecting a best answer from the one or more answers to the question, formatting the question and the best answer to a user-generated content style, and migrating the question and the best answer to a user-generated content style web site (also known as a Wiki Site).

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description of the embodiments, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Figure 1:
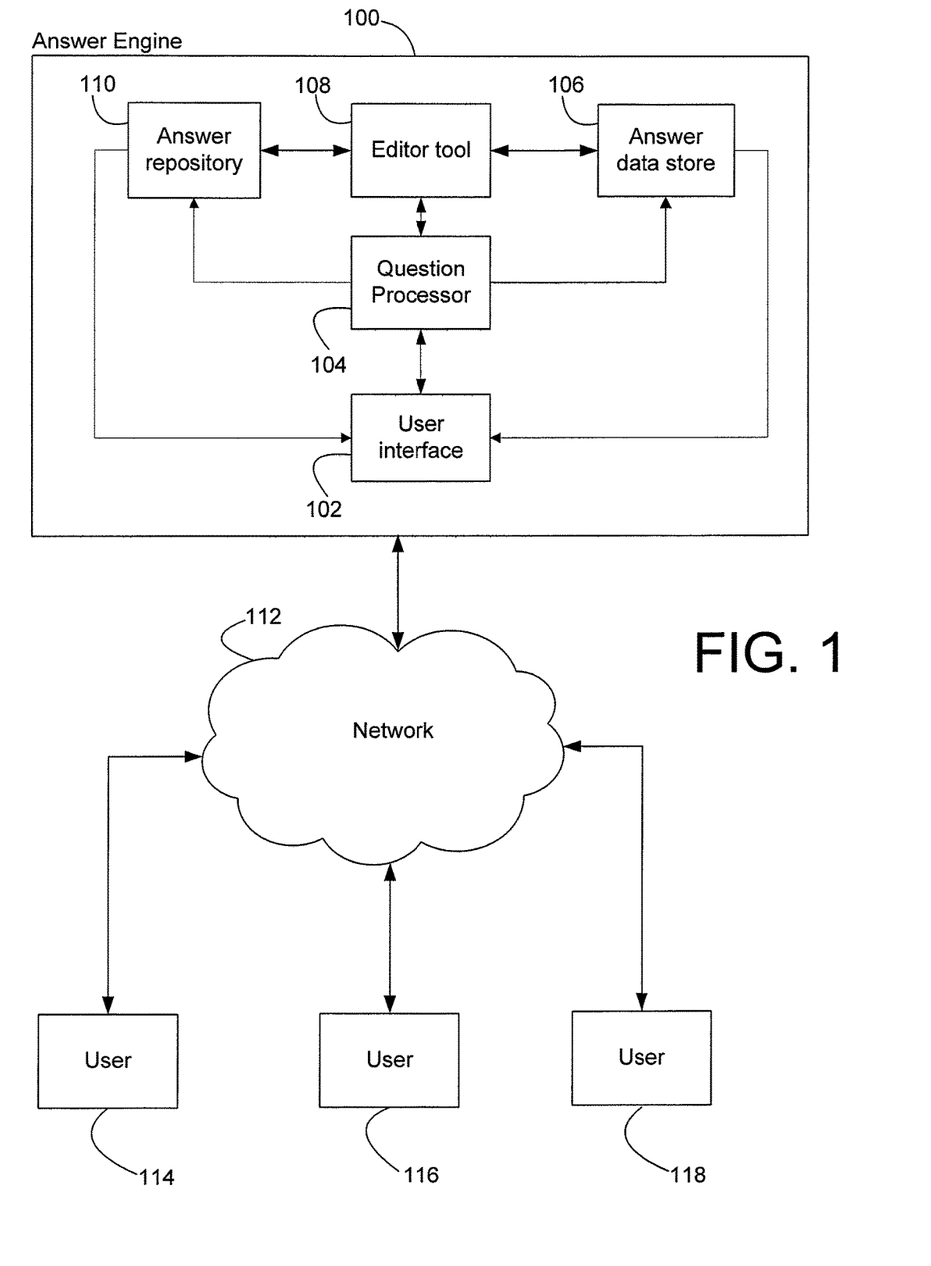
FIG. 1 is a block diagram presenting a system for asking and searching for answers to a given question, according to one embodiment of the present invention.

FIG. 1 presents a block diagram depicting a system for asking and searching for answers to a given question, according to one embodiment of the present invention. According to the embodiment of FIG. 1, an answer engine 100 comprises one or more software and hardware components operative to facilitate asking and searching for answers to given questions including, but not limited to, a user interface 102, a question processor 104, an answer data store 106, an editor tool 108, and an answer repository 110.

The answer engine 100 is communicatively coupled with a network 112, which may include a connection to one or more local or wide area networks, such as the Internet. Users 114, 116 and 118 comprise individuals who access the answer engine 100 from client devices, to either ask for answers to questions from others users, search for questions previously asked and answered by other users, or to answer questions posted by other users. A client device 114, 116 and 118, may, for example, comprise a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 100 GB of hard drive storage space and an Ethernet interface to a network. Other client devices are considered to fall within the scope of the present invention including, but not limited to, hand held devices, set top terminals, mobile handsets, etc.

A client device 114, 116 and 118 typically runs software applications, such as a web browser (not pictured), which provides for the transmission of query requests, as well as display of answers to such requests on the user interface 102, which may comprise one or more web pages with content that is relevant and useful for answering specific questions that a given user submits.

A given client device 114, 116 and 118 connects to the answer engine 100 via the network 112. Upon providing a question via the user interface 102, the question processor 104 determines if an answer to the question, or an answer to a similar question, exists in the answer data store 106. The question processor 104 may comprise a server-based computer or software component that converts a question into a search string, which may be a natural language search string, for comparison with previously entered search strings. The answer data store 106 may comprise a database of previous search strings from users, along with indexed answers to questions categorized according to topics and subtopics. For example, a user may ask, "Why is the sky blue?" or "How many games have the New York Knicks lost this season?" The answer engine 100 may categorize answers to these questions under such topics as nature, environmental science and physics for the former question, and sports, basketball and New York teams for the latter.

If a corresponding search string and answer to either of the abovementioned questions exists, then the answer engine 100 presents the answer for displayed to the user on a client device 114 via the user interface 102. If no corresponding search string and answer to either question exists in the answer data store 106, however, the question may be placed in the answer repository 110 for another user 116 or 118 to answer. According to one embodiment, the answer repository 110 may comprise a database of such previously asked, yet unanswered, questions as individual pages viewable through the user interface 102, upon which users may utilize client devices 114, 116 and 118 to post answers to such questions. The answer repository 110 may hold unanswered questions for a specified duration of time before discarding them or, alternatively, may maintain unanswered questions indefinitely. Additionally, a user asking a question may provide an email address to the question processor 104, which may then notify the user should any suggested answers from other users appear on a question page in the answer repository 110.

Upon providing an answer to a question that a user posts, the editor tool 108 is provided by the user interface 102 to format the answer into a user-generated content style. According to one embodiment, the current state of the art for a user-generated content style comprises Wikimedia (hereinafter "Wiki"). Wiki is a type of computer software that allows users to easily create, edit and link web pages. Formatting on a Wiki is implemented with a simplified markup language, sometimes known as "wikitext". For example, starting a line of text with an asterisk ("*") is often used to code an item in a bulleted list. Style and syntax of wikitexts can vary among Wiki implementations, some of which also allow for the inclusion of HTML tags. The reasoning behind this design is that HTML, with its many cryptic tags, is not especially human-readable. Furthermore, the actual text content is hard to read within HTML, making it difficult to edit. Those of skill in the art recognize that the editor tool 108 may utilize any number and type of markup languages for formatting and presentation of an answer to a given questions in the answer repository 110.

According to one embodiment of the present invention, a user is supplied with an "edit summary" by the editor tool 108 when he or she edits a page comprising one or more answers. The edit summary may comprise a short piece of text (for example, one line) summarizing the changes that the user is providing, which may or may not be inserted into the primary content of the page and allows a user to explain what changes have been made and the purpose behind a given changes. Additionally, the Wiki functionality provides for keeping a record of changes made to pages; allowing for maintenance of multiple versions of a page. This enables a user to revert to an older version of an answer page should it be necessary where, for example, a mistake has been made or the page has been vandalized.

It may be the case that there exists more than one correct answer to a given question. For example, the question, "why the sky is blue?" may have more than one correct answer depending on the perspective of the person either asking or answering the question. A physicist might say that the sky appears blue because the molecules in air scatter short-wavelength light more than longer wavelengths. Since blue light is at the short wavelength end of the visible spectrum, it is more strongly scattered in the atmosphere than long wavelength red light. By contrast, a second grade teacher might say that the sky is blue because sunlight is made up of all the colors of a rainbow, and the air in the sky collides with the blue light and causes it to shine. Both answers, while correct, are geared towards different audiences. Using a client device 116 or 118, a user may group both answers together with the editor tool 108 for storage on a single Wiki page in the answer data store 106.

If an answer exists in the answer data store 106 with search string that is similar to the question presented by user on a client device 114, the user at the client device 114 may be presented with that answer as a potential answer to his or her question. According to one embodiment of the present invention, the system presents the potential answer alongside the editor tool 108 through the user interface 102, thereby enabling the user at the client device 114 to authenticate the previously given answer as a potentially valid answer to his or her new question. For example, a user at a client device 114 may ask, "Why isn't the sky red?" Upon entering this question, the question processor 104 may determine that this question is comparable, similar or otherwise related to the question, "why is the sky blue?" The question processor 104 may then retrieve the answer to the "why is the sky blue" question from the answer data store 106 for presentation on the user interface 102 as a potential answer to the user's new question. The user 114 may now authenticate or otherwise confirm the answer to the "why is the sky blue" question as correlating to the "why isn't the sky red" question.

Figure 2:
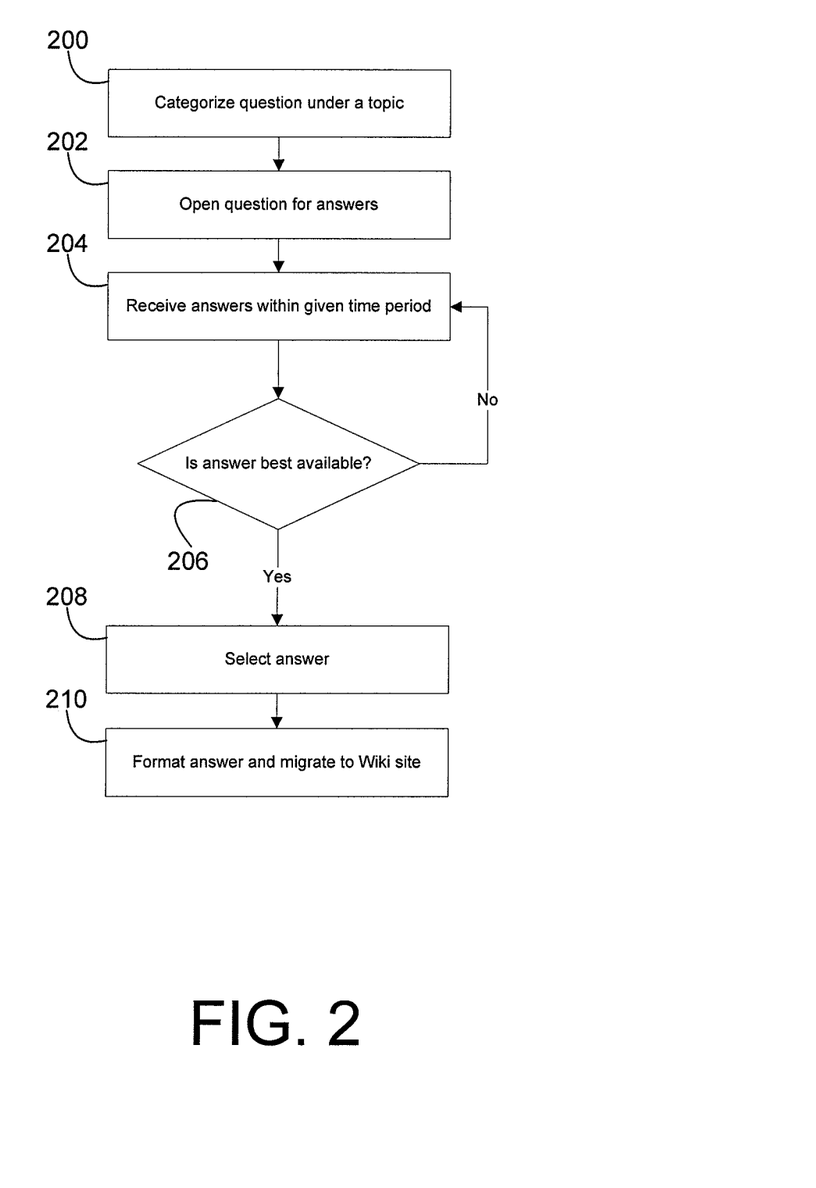
FIG. 2 is a flow diagram presenting a method for formatting answers received in response to a given question, according to one embodiment of the present invention.

One embodiment of a method for using the system of FIG. 1 to format answers received in response to a given question is illustrated in the flow diagram of FIG. 2. According to the method of FIG. 2, a question is categorized or compartmentalized under a topic in a taxonomy-styled arrangement, step 200. For example, the question may be asked, "Why is the sky blue?" According to one embodiment, this question is categorized under such topics as general interest, environmental science, nature, physics, or any combination thereof. Furthermore, the question may be categorized under a hierarchical structure of topics, for example: General Interest→Science→Environmental Science→Atmosphere. According to one embodiment, the categorization may be implemented manually by an individual or by software-based algorithms known to those of skill in the art.

One or more of the categorized question may be opened to be answered, step 202. According to one embodiment, a user may post the question on a message board type system that one or more other users visit, which the method may organize under a listing of one or more various topics or categories to which the question is relevant. For example, the question "why is the sky blue?" may be posted on a web page under the topic of environmental science, nature, physics, or any combination thereof as discussed above. Users of the system may view the web page comprising the question either directly or by clicking a hyperlink corresponding to a topic under which the question may be categorized.

The question may be posted for a finite period of time, step 204. According to one embodiment, the question may be posted for a user-specified amount of time or in accordance with a predefined time limit, for example, three days. Additionally, depending on feedback or response from other users, the duration may be adjusted accordingly. Different users may input what they believe to be a correct answer with such answers being displayed in conjunction with the question on a web page. According to one embodiment of the present invention, users are incentivized to answer questions by being awarded points or prizes for providing a best answer to a specific question.

The best answer among the given answers is determined, step 206, which the method may determine in accordance with a variety of different techniques, such as user-voting, and selected, step 208. This answer may be formatted and transmitted to a web page on a Wiki site, step 210. According to one embodiment, the answer is formatted with a Wiki editor by an individual user of the system and may be uploaded to a formalized Wiki website after being reviewed by a number of other users.

Figure 3:
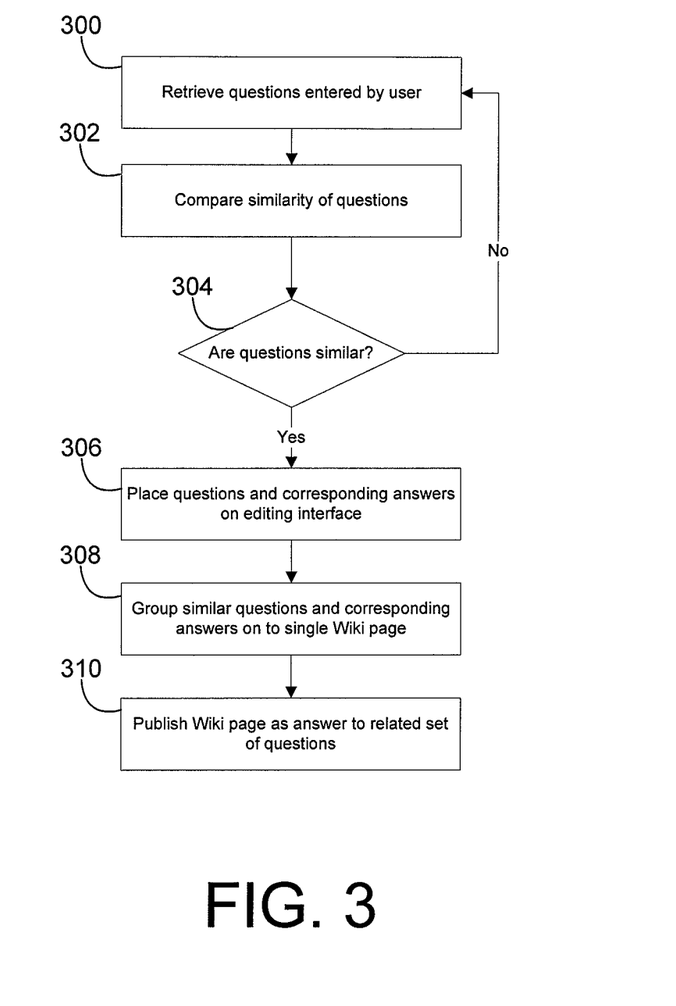
FIG. 3 is a flow diagram presenting a method for grouping similar questions and corresponding answers together on a single Wiki page, according to one embodiment of the present invention.

FIG. 3 is a flow diagram presenting one embodiment of a method for grouping similar questions and corresponding answers together on a single Wiki page. First, questions entered by users are retrieved, step 300. The questions may comprise, for example, any questions pertaining to any subject or topic of interest to an individual user.

The method compares the similarity of a new question posted by a user to one or more previously answered questions from other users, step 302. According to one embodiment, this comparison is achieved by parsing a question into a searchable string and comparing the string to previously posted questions. For example, the question, "why is the sky blue," when parsed down to individual words may be searchable by a given substantive word: why, sky, and blue. It is next determined whether the newly posted question is similar to one or more existing questions, step 304. Upon reaching a minimum threshold of similarity, the questions may be placed together on an editing interface along with any corresponding answers, step 306. For example, the new question "what creates the color of the sky," may be grouped together with "why is the sky blue," "why isn't the sky red," and "what is the color of a rainbow," on the editing interface, step 306. Some or all of the previously posted questions may have one or more corresponding answers.

The user that posted the new question (or other users) may determine if the question relates to the other questions to a certain degree where an existing answer provides an answer to the newly posted question. According to one embodiment of the present invention, the user may then group the similar questions and corresponding answers together on to a Wiki page, step 308. For example, the user may find that question, "What is the color of a rainbow," and its corresponding answer do not relate sufficiently to the new question of "what creates the color of the sky." The user may remove the "rainbow" question through use of the editing interface. Additionally, the user may find that the previously posted question, "why is the sky blue," and its corresponding answer do relate to the other questions. The user may then group the questions and answers together on a single Wiki page, step 308. The Wiki page may be published on a formalized Wiki website, with the newly asked (and other related) questions corresponding to the existing answer of a previous posted question, step 310.

Figure 4:
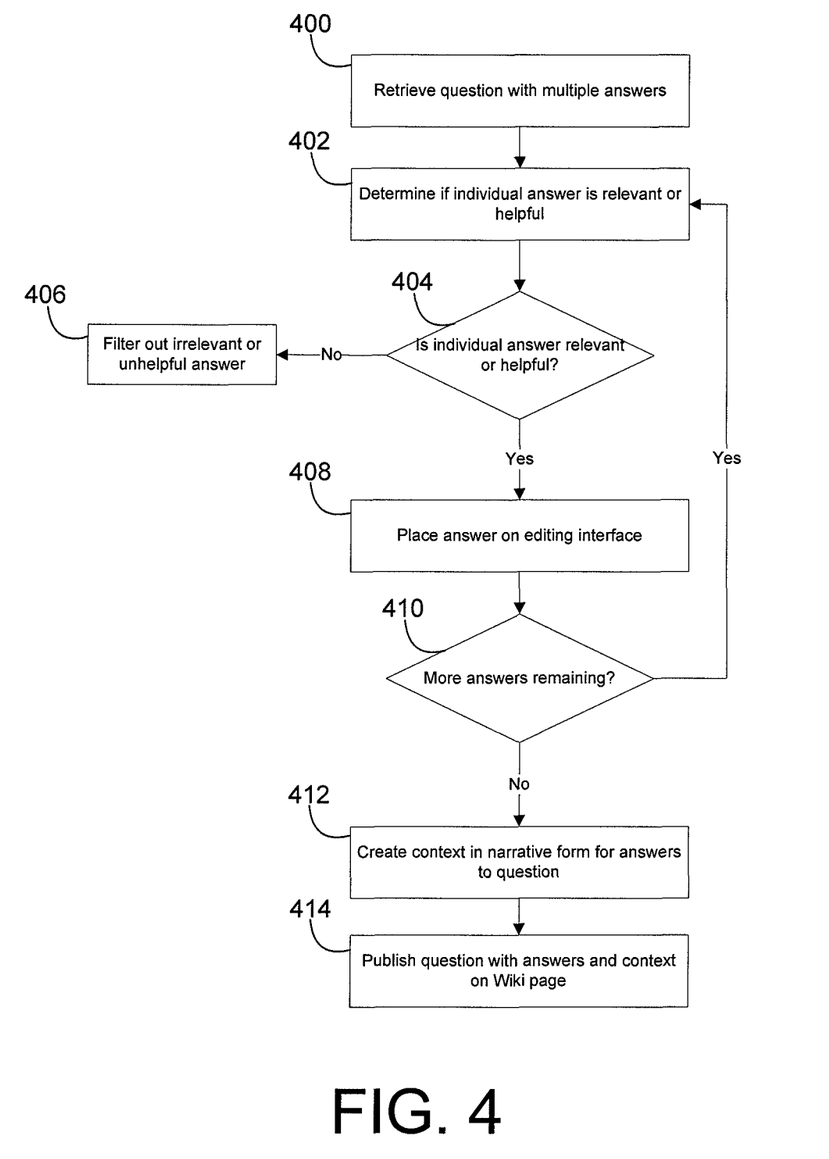
FIG. 4 is a flow diagram presenting a method for creating context around answers where multiple correct answers exist for a given question, according to one embodiment of the present invention.

FIG. 4 is a flow diagram illustrating a method for creating context around answers where multiple correct answers exist for a given question. According to one embodiment of the present invention, a user's question may be answered by many different people and, depending on the nature of the question, multiple correct answers may exist. One or more answers may be retrieved along with a question, step 400, and a determination may be made as to whether a given individual answer is helpful, relevant, or otherwise germane to the question, step 402. The helpfulness or relevancy may be determined, for example, by other users, by an editor, or by one or more software algorithms known to those of skill in the art.

Irrelevant or unhelpful answers may be filtered out, step 406. For example, answers to the question "why is the sky blue," may comprise "because the molecules in air scatter short-wavelength light such as blue, more than longer wavelengths," "because air breaks the light into different colors," and "because it is a reflection of the ocean." While the first answer is the most accurate and the second is a simplified version of the first, the third answer is incorrect and may be filtered out or otherwise disassociated from the question, step 406.

The remaining answers may be placed on an editing interface for incorporation into one or more Wiki pages, step 408, with users provided an opportunity to create context around the answers, step 412. Providing context around a given answer effectively allows for multiple correct answers. According to one embodiment, the context is in the form of a descriptive annotation. For example, a user may note that the first answer from the previous example was provided by a university professor of physics and the second answer was provided by middle school science teacher.

While both answers from the abovementioned question are technically correct, a given answer appeals to different audiences. According to one embodiment of the present invention, either the user who posted the question, the user who provided the answer, or any other user of the system may incorporate a narrative element to better describe an individual answer. For example, regarding the second answer from above, a narrative context may comprise, "this answer is most suitable for $6^{th}$ grade students," or "this answer was provided by a middle school science teacher." The question and the one or more correct answers with accompanying context may be published on a single Wiki page or a plurality of Wiki pages, step 414.

While the invention has been described and illustrated in connection with multiple embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

FIGS. 1 through 4 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

We claim:

1. A system for providing an answer to a given question, the system comprising:
   an answer data store configured to store previously asked questions and answers to the previously asked questions, wherein the stored answers are provided by one or more users connected to the system via a network;
   at least one processor configured to execute computer program instructions from a machine-readable medium to:
   receive, over the network, a first question from a first user;
   determine at least one topic associated with the first question;

select one or more additional questions and one or more answers associated with the one or more additional questions from the answer data store based on the at least one topic;

present, to the first user over the network via a user interface, the one or more additional questions and the one or more answers;

request the first user to confirm that the first question is similar to the one or more additional questions; and upon the confirmation, associate the first question with the one or more additional questions and the one or more answers via an editor tool provided by the user interface;

receive, over the network, a second question different from the first question;

determine that the second question is related to the at least one topic;

present, via the user interface, the one or more answers and one or more annotations that respectively correspond to and provide context for the one or more answers; and select, via the user interface, one of the one or more answers based on the one or more annotations.

2. The system of claim 1, wherein the confirmation comprises the first user grouping, via the user interface, the first question with the one or more additional questions and the one or more answers, and wherein the first question, the one or more additional questions, and the one or more answers are provided for presentation together on the user interface in response to the grouping.

3. A method for providing an answer to a given question, the method being implemented on a machine having at least one processor, storage, and communication network, the method comprising:

receiving, over the network by the at least one processor, a first question from a first user;

determining, by the at least one processor, at least one topic associated with the first question;

selecting, by the at least one processor, one or more additional questions and one or more answers associated with the one or more additional questions from an answer data store based on the at least one topic;

presenting, over the network via a user interface to the first user, the one or more additional questions and the one or more answers;

requesting the first user to confirm that the first question is similar to the one or more additional questions; and upon the confirmation, associating the first question with the one or more additional questions and the one or more answers via an editor tool provided by the user interface;

receiving, over the network, a second question different from the first question;

determining, by the at least one processor, that the second question is related to the at least one topic;

presenting, via the user interface, the one or more answers and one or more annotations that respectively correspond to and provide context for the one or more answers; and selecting, via the user interface, one of the one or more answers based on the one or more annotations.

4. The method of claim 3, wherein the confirmation comprises the first user grouping, via the user interface, the first question with the one or more additional questions and the one or more answers, and wherein the first question, the one or more additional questions, and the one or more answers are provided for presentation together on the user interface in response to the grouping.

5. Non-transitory computer readable media comprising program code for execution by at least one processor to perform a method for providing an answer to a given question, the program code of the computer readable media comprising:

program code for receiving, over a communication network, a first question from a first user;

program code for determining at least one topic associated with the first question;

program code for selecting one or more additional questions and one or more answers associated with the one or more additional questions from an answer data store based on the at least one topic;

program code for presenting, to the first user over the network via a user interface, the one or more additional questions and the one or more answers;

program code for requesting the first user to confirm that the first question is similar to the one or more additional questions; and program code for associating, upon the confirmation, the first question with the one or more additional questions and the one or more answers via an editor tool provided by the user interface;

program code for receiving, over the network, a second question different from the first question;

program code for determining that the second question is related to the at least one topic;

program code for presenting, via the user interface, the one or more answers and one or more annotations that respectively correspond to and provide context for the one or more answers; and program code for selecting, via the user interface, one of the one or more answers based on the one or more annotations.

6. The computer readable media of claim 5, wherein the confirmation comprises the first user grouping, via the user interface, the first question with the one or more additional questions and the one or more answers, and wherein the first question, the one or more additional questions and the one or more answers are provided for presentation together on the user interface in response to the grouping.

7. The system of claim 1, wherein the context indicates one or more targeted audiences or expertise of the one or more users.

8. The system of claim 1, wherein the at least one processor is further operative to:

responsive to neither the user nor the one or more users confirming the similarity within an initial duration of time, discard, via the answer data store, the first question.

9. The system of claim 8, wherein the at least one processor is further operative to:

modify the initial duration of time in response to user interaction of users other than the user with the first question such that, responsive to the association remaining unconfirmed throughout the modified duration of time, the first question is discarded.

10. The method of claim 3, wherein the context indicates one or more targeted audiences or expertise of the one or more users.

11. The method of claim 3, further comprising:
responsive to neither the user nor the one or more users confirming the similarity within an initial duration of time, discard, via the answer data store, the first question; and
modifying, by the at least one processor, the initial duration of time in response to user interaction of users other than the user with the first question such that, responsive to the association remaining unconfirmed throughout the modified duration of time, the first question is discarded.

12. The computer readable media of claim 5, wherein the context indicates one or more targeted audiences or expertise of the one or more users.

13. The computer readable media of claim 5, further comprising:
program code for, responsive to neither the user nor the one or more users confirming the similarity within an initial duration of time, discarding, via the answer data store, the first question; and
program code for modifying the initial duration of time in response to user interaction of users other than the user with the first question such that, responsive to the association remaining unconfirmed throughout the modified duration of time, the first question is discarded.

14. The system of claim 1, wherein the confirmation comprises a confirmation that the one or more answers provide an answer to the first question.

15. The method of claim 3, wherein the confirmation comprises a confirmation that the one or more answers provide an answer to the first question.

16. The computer readable media of claim 5, wherein the confirmation comprises a confirmation that the one or more answers provide an answer to the first question.

17. The system of claim 1, further comprising:
the editor tool configured, with respect to the user interface, to:
format the previously asked questions and the answers stored in the answer data store into user-generated content style;
migrate the previously asked questions and the answers stored in the answer data store to a user-generated content style web page; and
group together and format the first question, the one or more additional questions, and the one or more answers into a single user-generated content style web page, if the user responds with the confirmation.

18. The system of claim 1, wherein a duration of the one or more answers on one or more webpages, in relation to which the user interface presents the one or more answers, is based on feedback or response from users other than one(s) who provided the one or more answers.

* * * * *